United States Patent [19]
Rohs et al.

[11] Patent Number: 6,062,359
[45] Date of Patent: May 16, 2000

[54] HYDRODYNAMIC POWER TRANSFORMER

[75] Inventors: Ulrich Rohs, Düren; Dietmar Heidingsfeld, Aachen, both of Germany

[73] Assignee: Rohs-Voigt Patentverwertungsgesellschaft mbH, Düren, Germany

[21] Appl. No.: 09/195,259

[22] Filed: Nov. 18, 1998

[30] Foreign Application Priority Data

Nov. 21, 1997 [DE] Germany .......................... 197 51 752

[51] Int. Cl.$^7$ ................................................ F16H 45/02
[52] U.S. Cl. ...................... 192/3.29; 192/103 F; 192/212
[58] Field of Search .................... 192/3.28, 3.29, 192/54.3, 212, 103 A, 103 F, 103 FA

[56] References Cited

U.S. PATENT DOCUMENTS

| | | |
|---|---|---|
| Re. 31,621 | 7/1984 | Moroto et al. . |
| 4,930,608 | 6/1990 | Schenk et al. ........................ 192/3.29 |
| 5,248,016 | 9/1993 | Umezawa ........................ 192/3.28 |
| 5,310,033 | 5/1994 | Shibayama ........................ 192/3.29 |
| 5,590,750 | 1/1997 | Graton et al. . |
| 5,732,804 | 3/1998 | Wienholt ........................ 192/3.29 |

FOREIGN PATENT DOCUMENTS 30 29 860 A1  3/1982  Germany .

OTHER PUBLICATIONS

JP–1–46063 A., In: Patent Abstracts of Japan, M–832 May 30, 1989, vol. 13, No. 234; "Lock–Up Device for Torque Converter"; Masahiro Okubo.

*Primary Examiner*—Rodney H. Bonck
*Assistant Examiner*—Saúl Rodriguez
*Attorney, Agent, or Firm*—Henry M. Feiereisen

[57] ABSTRACT

The hydraulic power transformer has a controllable, non-slip jumpering of the hydrodynamic system with insertion of a torsional vibration damper. The torsional vibration damper exhibits a device that varies the damping based on a liquid pressure acting in the vicinity of the device. This device preferably has a piston, which can be moved by the liquid pressure against a surface, and hence generates a damping.

14 Claims, 4 Drawing Sheets

HYDRODYNAMIC POWER TRANSFORMER

BACKGROUND OF THE INVENTION

The invention relates to a hydrodynamic power transformer with a controllable, non-slip jumpering of the hydrodynamic system with insertion of a torsional vibration damper.

Such hydrodynamic power transformers are known in the art as trilock converters for automatic transmissions, for example. These trilock converters have a lockup coupling as the controllable, non-slip jumpering, which jumpers the hydrodynamic system, connecting the input side of the converter with the turbine wheel or the input shaft of the mechanical part of the automatic transmission.

The non-slip jumpering of the hydrodynamic system results in a mechanical through-coupling, which conveys the torsional vibrations from the engine to the transmission input. This produces undesired noises and alternating loads. For this reason, a torsional vibration damper designed to eliminate these vibrations is built into generic hydrodynamic power transformers.

Practice shows that current torsional vibration dampers most often do not do their job completely, however, so that the lockup coupling has to be opened in many areas of operation to achieve an acceptable performance. However, this leads to a clearly elevated fuel consumption.

SUMMARY OF THE INVENTION

The object of this invention is to improve a generic hydrodynamic power transformer in such a way as to optimize damping at every operating point.

The object is achieved by virtue of the fact that the torsional vibration damper exhibits a device that varies the damping based on a liquid pressure acting in the vicinity of the device.

The invention is based on the knowledge that the liquid pressure acting in hydrodynamic power transformers can be used to control damping. A torque-dependent damping is achieved as a result.

It is advantageous for the device to exhibit at least one piston that can be moved by the liquid pressure against a surface. While the liquid pressure causes the piston to change its position, the surface offers the piston a resistance, thereby giving rise to a slip between the surface and piston, which results in friction, and hence a damping.

To increase this friction, and hence damping, it is proposed that frictional linings be set up between the piston and surface. These frictional linings make it possible to optimally tailor damping to the system.

In one preferred embodiment, the piston is designed as an annular piston. This enables a highly advantageous arrangement of the piston in known hydrodynamic power transformers.

In an advantageous configuration, the piston is connected with a turbine of the hydrodynamic power transformer in a torsion-proof and axially adjustable manner. This enables a rotation of the piston with the drive, and simultaneously a damping by means of the piston.

It is advantageous for the device to exhibit holders that limit the distance between the surface and piston. These holders can be rigid or adjustable.

It is also advantageous for the device, in particular the piston, to exhibit holes to set the liquid pressure acting on the device. These holes make it possible to adjust the liquid pressure acting on the piston given a piston surface predetermined by the design.

In one particularly preferred variant, the device exhibits means to control the liquid pressure acting on the devices.

One way to achieve speed-dependent control is by equipping the means with holes and centrifugal valves. These centrifugal valves can open and close the holes, depending on the speed of the system.

In one structurally very simple configuration of such centrifugal valves, the centrifugal valves exhibit leaf springs which are moldable so that the holes can be opened or closed. The springs expand at the end, enabling use as a sealing plate for the holes and as a weight.

To enable incremental control of the liquid pressure acting in one direction, the means can exhibit several chambers that can be filled with varying levels of pressure. The described centrifugal valves must be set up in such a way that, distributed around the periphery, they open at varying rotational speeds, so that different areas of the piston, also referred to as chambers, are gradually filled with oil pressure or relieved.

It is advantageous for the torsional vibration damper to exhibit tangentially arranged spiral springs. These spiral springs trigger a high vibration absorption, as in conventional torsional vibration dampers.

Since in particular longer, tangentially arranged, easily bent spiral springs deform at high speeds due to centrifugal forces in such a way as to scrape against the casing of the hydrodynamic power transformer, it is proposed that a ring carrier support the springs against the centrifugal forces acting on the springs. This ring carrier preferably engages the middle of the tangentially bent springs, and prevents an increased bulging by the springs in a radial direction.

The invention further provides that the ring carrier be centered relative to the device. The ring carrier is preferably centered by at least three points. This increases the mobility of the ring carrier relative to the device.

In one preferred variant, centering allows for some free motion. The allowance must minimize friction between the springs and casing, or keep it at a preset limit.

Depending on the arrangement of the ring carrier in the hydrodynamic power transformer, it may be advantageous for the ring carrier to exhibit openings for liquid to pass through. Such openings ensure that the ring carrier does not reduce the liquid pressure on the device too much.

In one special configuration of the ring carrier, the ring carrier is part of a piston that can be moved by the liquid pressure against a surface. The one-piece formation of the ring carrier and piston results in a simple design, and reduces the number of parts needed during assembly of the hydrodynamic power transformer.

It is proposed that the ring carrier be axially situated between the piston and surface so as not to impede the liquid pressure on the device by the ring carrier.

BRIEF DESCRIPTION OF THE DRAWINGS

An exemplified embodiment of the invention will now be described in more detail with reference to the drawing, in which.

DETAILED DESCRIPTION OF THE PREFERRED EMBODIMENTS

Figure 1:
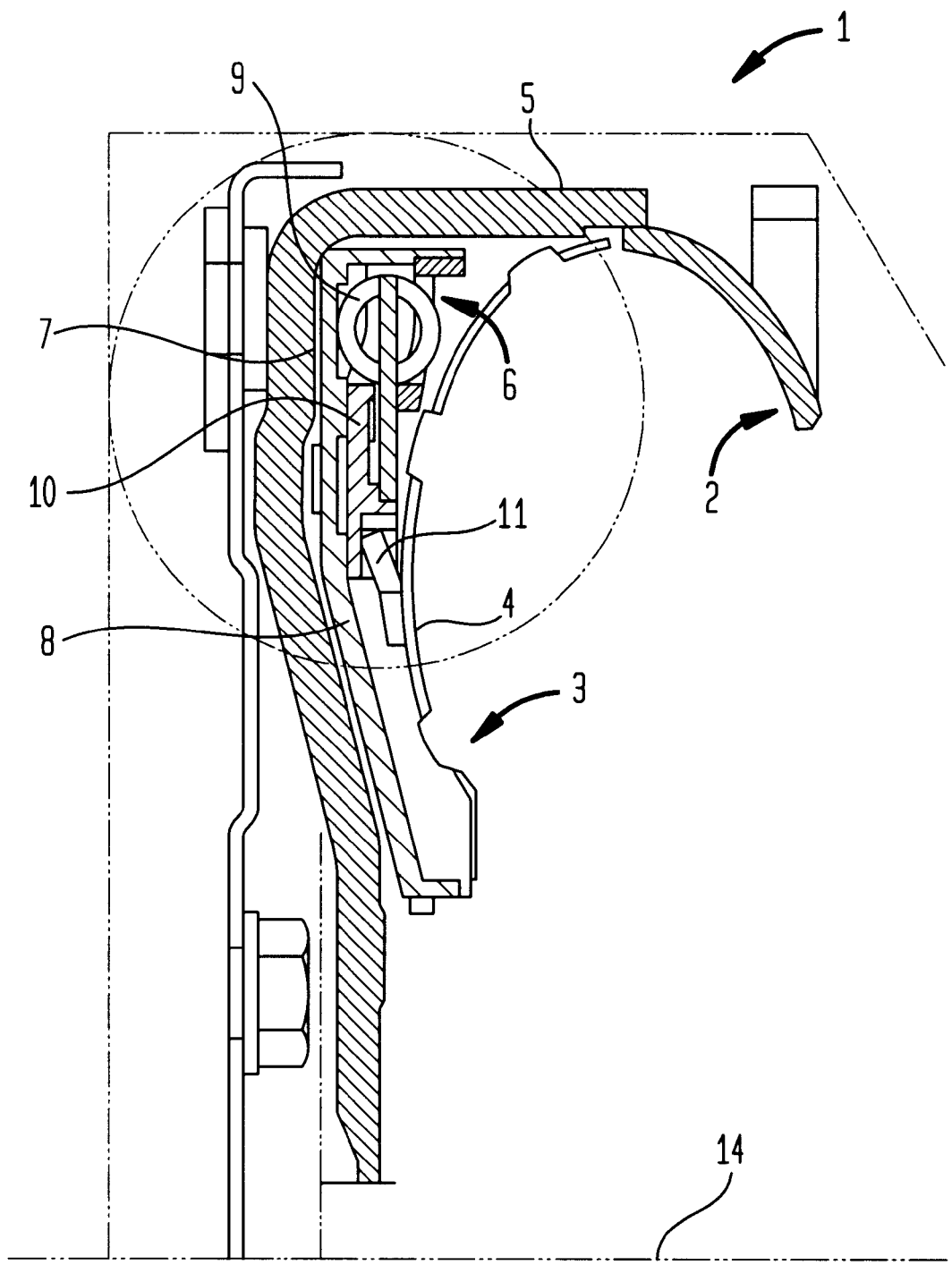
FIG. 1 is a section through a partial area of the hydrodynamic power transformer according to line I—I in FIG. 5.
Figure 2:
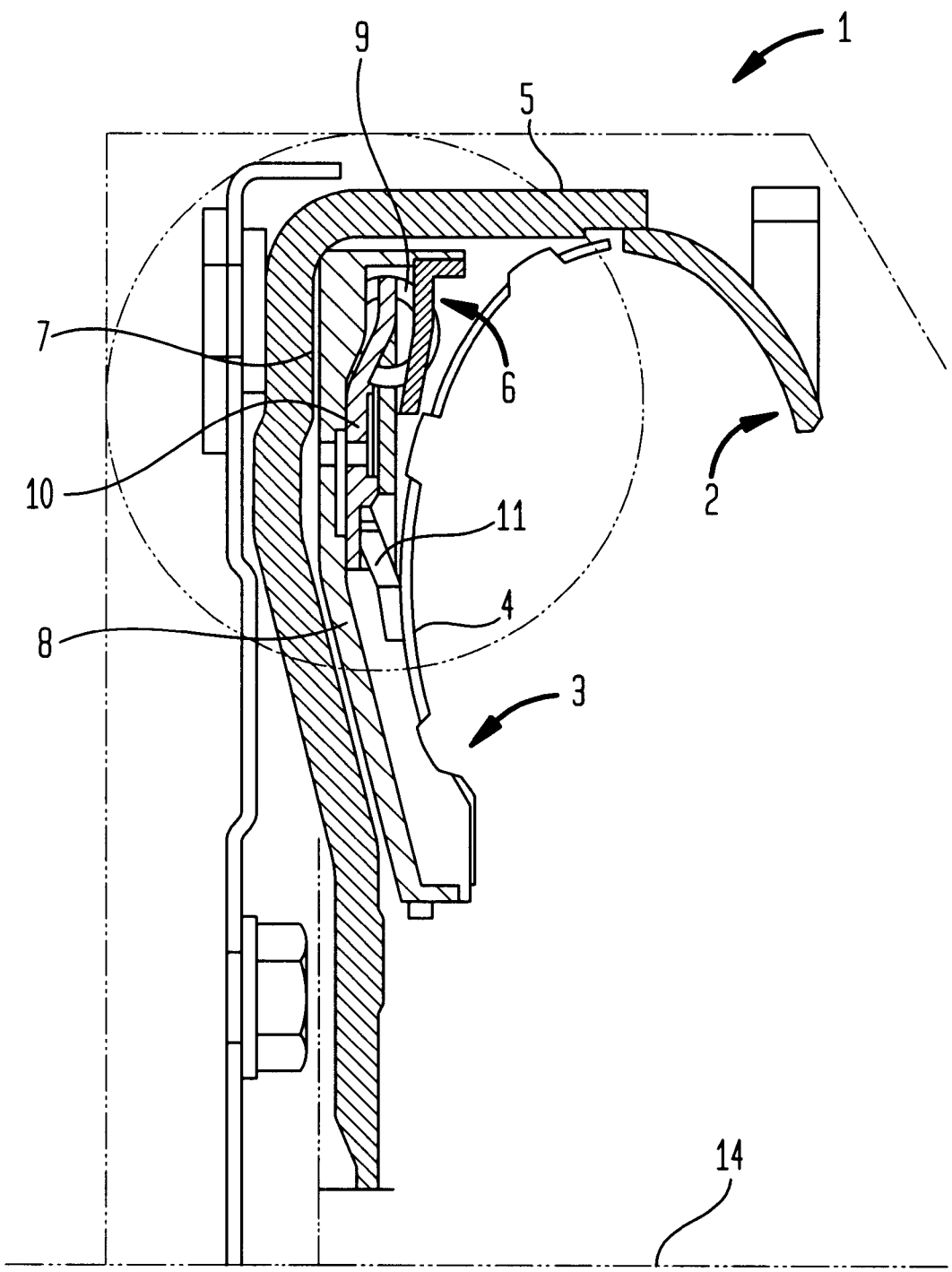
FIG. 2 is a section through a partial area of the hydrodynamic power transformer according to line II—II in FIG. 5.

The hydrodynamic power transformer 1 shown in FIG. 1 essentially consists of pump 2 and turbine 3. Pump 2 also forms the casing of power transformer 1, and is connected to the drive (not shown), while turbine 3 is situated inside the casing, and is connected to the drive (not shown).

Situated between the shell-shaped turbine part 4 and pot-shaped casing part 5 in the radially arranged part of power transformer 1 is a torsional vibration damper 6, which is configured in such a way that it can connect the pot-shaped casing part 5 connected with the drive to the shell-shaped turbine part 4, and hence to the drive.

Given an elevated liquid pressure in the radially exterior part of hydrodynamic power transformer 1 on torsional vibration damper 6, the entire torsional vibration damper in the drawing is pressed to the left against a frictional lining 7 secured to the pot-shaped part 5, so that the primary part 8 of torsional vibration damper 6 is rigidly connected to casing part 5, and hence to the drive. Frictional linings 7 are designed to ensure non-slip jumpering at this location.

Primary part 8 of torsional vibration damper 6 is connected to secondary part 10 via tangentially arranged spiral springs 9. This secondary part 10 is connected to turbine 3, and hence to the drive, via a preceding element 11.

Figure 3:
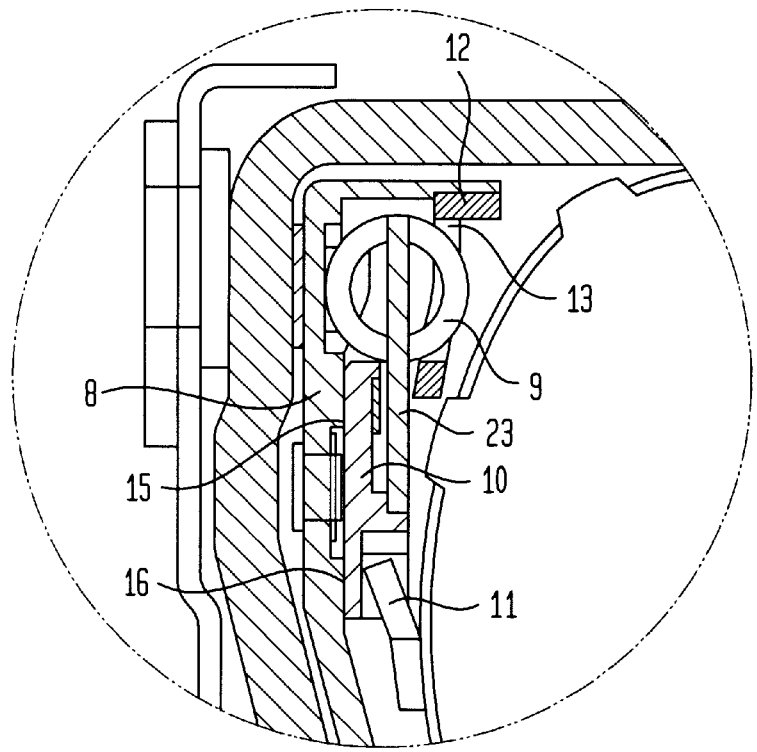
FIG. 3 is a magnified detail from FIG. 1.
Figure 4:
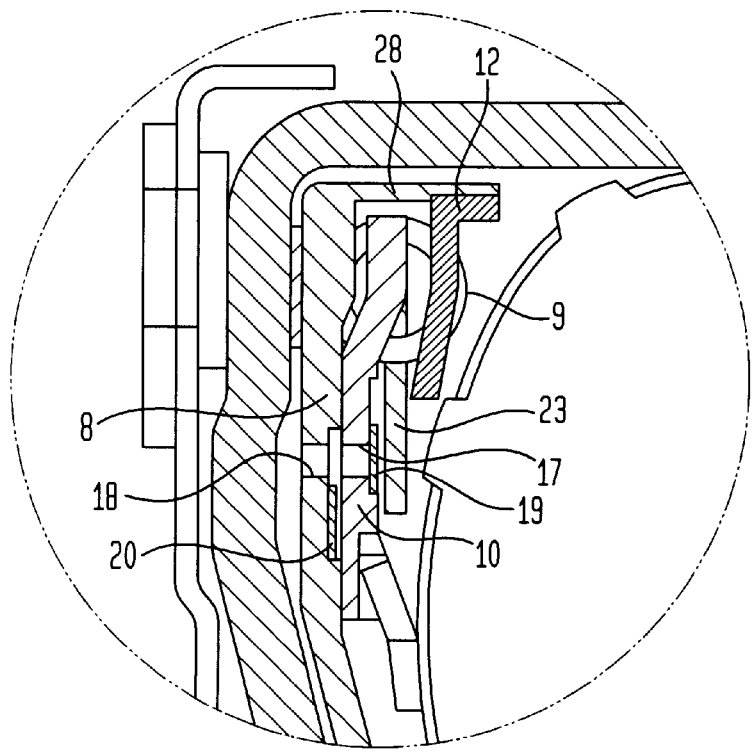
FIG. 4 is a magnified detail from FIG. 2.

In particular when FIGS. 3 and 4 are viewed together, it becomes clear that primary part 8 is connected to an annular disk 12, which accommodates windows 13. The spiral springs 9 secured to secondary part 10 project into these windows 13. This permits a limited rotational motion by primary part 8 relative to secondary part 10, around axis 14 of hydrodynamic power transformer 1.

During this relative motion between primary part 8 and secondary part 10, the parts rub against each other at their contact surfaces 15 and 16, which gives rise to a friction, and hence damping, in addition to the resilience due to spiral springs 9 at contact surfaces 15 and 16. Frictional linings can also be situated on these contact surfaces 15 and 16 (not shown in this example).

In the described torsional vibration damper, secondary part 10 acts as a piston that is pressed to more or less of an extent against surface 15, 16 of primary part 8, depending on the liquid pressure acting in this area of the casing.

In the present case, piston 10 is designed as an annular piston, which can only be moved in an axial direction by several tenths of a millimeter. This allowance is limited by projecting element 11, which also acts as a holder.

Magnified FIG. 4 shows clearly that both piston 10 and primary part 8 have holes 17 and 18 that influence the liquid pressure acting on device 8, 10. These holes 17 and 18 can be closed by valve flaps 19, 20.

Figure 5:
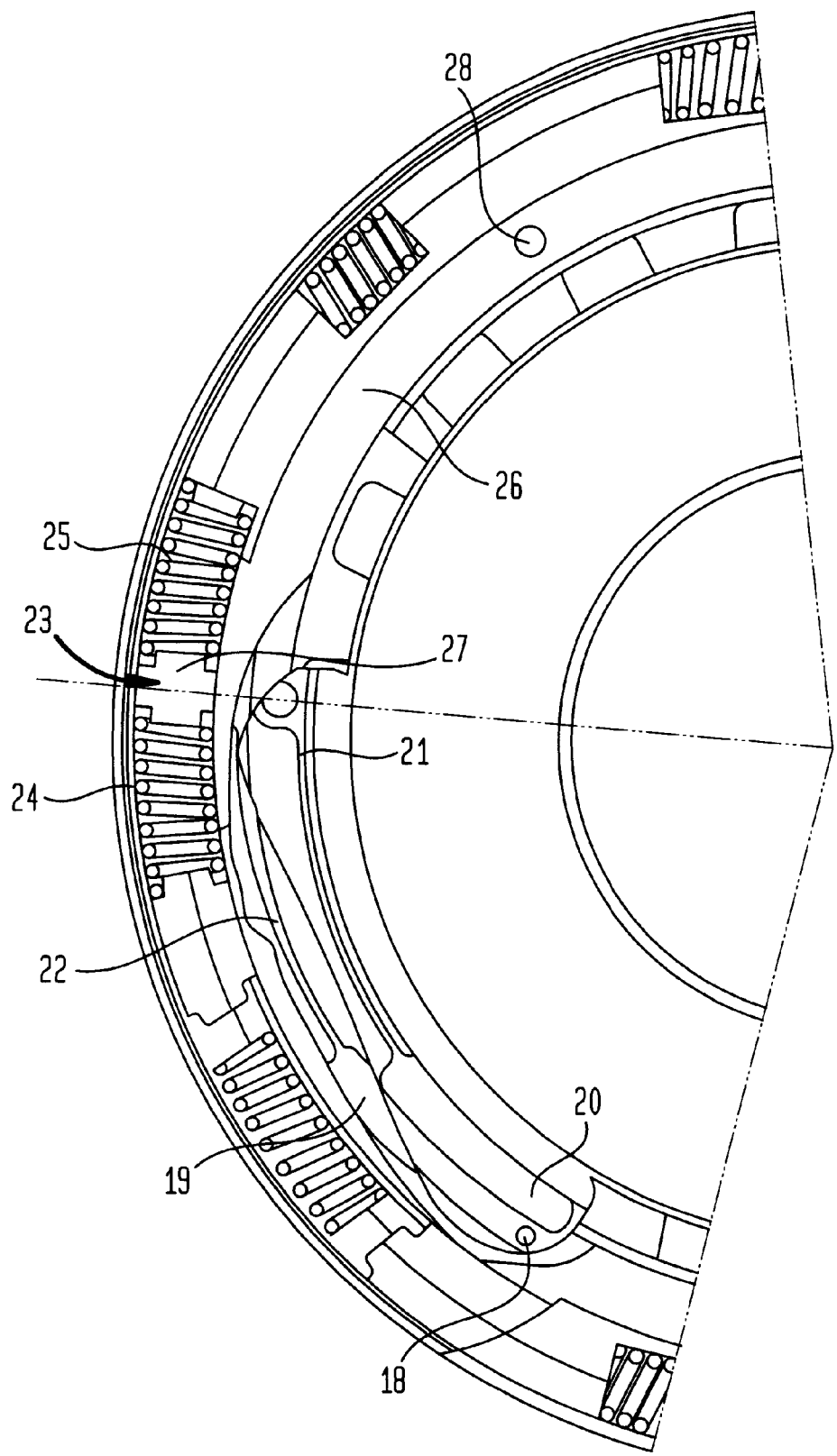
FIG. 5 is a cut top view of the power transformer according to the preceding Figures.

As valve flap 20 on FIG. 5 clearly shows, the valve flaps form the front end of a plate spring 21 or 22, and hence act as centrifugal valves. These centrifugal valves are designed in such a way that hole 17 in secondary part 10 is opened given a strong centrifugal force, while hole 18 in primary part 8 is closed given a strong centrifugal force.

Torsional vibration damper 6 can be configured in such a way that the trilock converter closes at about 1000 RPM. In this phase, hole 18 is open and hole 17 is closed. At a speed of about 1300 RPM, hole 18 is first sealed, as a result of which the pressure between the primary and secondary parts decreases, and damping diminishes. At 1400 RPM, hole 17 is opened, which further reduces the pressure and damping, so that damping approaches zero when hole 17 is completely open.

Another essential element in the described hydrodynamic power transformer that is inventive even taken in and of itself is the readily discernible ring carrier 23 in FIG. 5, which supports two spiral spring parts 24, 25 against centrifugal forces acting against spiral springs 24, 25. This ring carrier 23 has T-shaped elements 27 that project radially from a ring-like part 26; these elements engage a continuous spring, or are arranged between two springs, and prevent a radial bulging of springs 24, 25. This ensures that springs 24 and 25 rub against the radially outside part 28 of primary part 8 only with a defined force, if at all.

This ring carrier 23 is centered on torsional vibration damper 6 with some free motion. The ring-shaped part 26 of ring carrier 23 has holes 28 so as not to impede the flow of oil pressure to secondary part 10 of torsional vibration damper 6.

As an alternative (not depicted), ring carrier 23 can also comprise part of piston 10, or be situated axially between piston 10 and primary part 8.

What is claimed is:

1. A hydrodynamic power transformer, comprising a controllable, non-slip jumpering of the hydrodynamic system with insertion of a torsional vibration damper, said torsional vibration damper having tangentially arranged spiral springs and a device that varies the damping based on a liquid pressure acting in the vicinity of the device; and further comprising a ring carrier supporting the spiral springs against centrifugal forces acting on the spiral springs, said ring carrier being part of a piston which can be moved by the liquid pressure against a surface.

2. The hydrodynamic power transformer of claim 1, wherein the device includes the piston.

3. The hydrodynamic power transformer of claim 1, and further comprising frictional linings arranged between the piston and the surface.

4. The hydrodynamic power transformer of claim 1, wherein the piston is designed as an annular piston.

5. The hydrodynamic power transformer of claim 1, and further comprising a turbine, said piston being connected with the turbine in a torsion-proof and axially adjustable manner.

6. The hydrodynamic power transformer of claim 1, wherein the device exhibits holders that limit the distance between the surface and the piston.

7. The hydrodynamic power transformer of claim 1, wherein the device and the piston has holes to set the liquid pressure acting on the device.

8. The hydrodynamic power transformer of claim 1, wherein the device has control means to control the liquid pressure acting on the device.

9. The hydrodynamic power transformer of claim 8, wherein the control means has holes and centrifugal valves.

10. The hydrodynamic power transformer of claim 9, wherein the centrifugal valves exhibit plate springs that are moldable to open or close the holes.

11. The hydrodynamic power transformer of claim 1, wherein the device exhibits several chambers that can be filled with varying levels of pressure.

12. The hydrodynamic power transformer of claim 1, wherein the ring carrier is centered relative to the device.

13. The hydrodynamic power transformer of claim 12, wherein the centering allows for some free motion.

14. The hydrodynamic power transformer of claim 1, wherein the ring carrier has openings for liquid to pass through.

* * * * *